United States Patent
Radovich et al.

(10) Patent No.: US 7,223,890 B2
(45) Date of Patent: May 29, 2007

(54) ISOCYANATE REACTIVE MIXTURE AND PROCESS FOR PREPARING SAME

(75) Inventors: David A. Radovich, Pittsburgh, PA (US); Richard G. Skorpenske, South Charleston, WV (US); Gary W. Munko, Clinton, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 626 days.

(21) Appl. No.: 10/683,241

(22) Filed: Oct. 10, 2003

(65) Prior Publication Data

US 2005/0080203 A1 Apr. 14, 2005

(51) Int. Cl.
*C00C 43/00* (2006.01)
(52) U.S. Cl. .................................... 568/624
(58) Field of Classification Search .............. None
See application file for complete search history.

(56) References Cited

U.S. PATENT DOCUMENTS

| | | | |
|---|---|---|---|
| 3,278,457 A | 10/1966 | Milgrom | 260/2 |
| 3,829,505 A | 8/1974 | Herold | 260/611 B |
| 3,941,849 A | 3/1976 | Herold | 260/607 |
| 4,472,560 A | 9/1984 | Kuyper et al. | 526/120 |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,627,122 A | 5/1997 | Le-Khac et al. | 502/175 |
| 5,639,705 A | 6/1997 | Bowman et al. | 502/175 |
| 5,844,070 A | 12/1998 | Hayes et al. | 528/501 |
| 6,066,683 A * | 5/2000 | Beisner et al. | 521/174 |

OTHER PUBLICATIONS

U.S. Appl. No. 10/251,155, filed Sep. 20, 2002, title Double Metal Cyanide Catalyst Used To Prepare Polyols And The Processes Related Thereto.

* cited by examiner

*Primary Examiner*—Paul A. Zucker
(74) *Attorney, Agent, or Firm*—Joseph C. Gil; Lyndanne M. Whalen; John E. Mrozinski, Jr.

(57) ABSTRACT

The present invention relates to an improved isocyanate reactive mixture containing at least one DMC-catalyzed polyol and about 0.25 to about 15 wt. %, based on the total weight of the isocyanate-reactive mixture, of at least one ethylene oxide (EO) containing water compatibilizer. The isocyanate reactive mixtures of the present invention may find use in the preparation of polyurethane foams, coatings, elastomers, sealants, adhesives and the like.

5 Claims, No Drawings

ISOCYANATE REACTIVE MIXTURE AND PROCESS FOR PREPARING SAME

FIELD OF THE INVENTION

The present invention relates, in general to polyurethane production, and more specifically to an isocyanate reactive mixture containing at least one DMC-catalyzed polyol and 0.25 to 15 wt. %, based on the total weight of the isocyanate-reactive mixture, of at least one ethylene oxide (EO) containing water compatibilizer.

BACKGROUND OF THE INVENTION

Isocyanate reactive mixtures often contain polyols that are the polymerization products of alkylene oxides with polyhydric alcohols. In the preparation of such polyoxyalkylene polyols, starter compounds having active hydrogen atoms are oxyalkylated with alkylene oxides in the presence of a suitable catalyst. For many years, basic as well as double metal cyanide (DMC) catalysts have been used in oxyalkylation reactions to prepare polyoxyalkylene polyols.

Base-catalyzed oxyalkylation involves oxyalkylating a low molecular weight starter compound, such as propylene glycol or glycerine, with an alkylene oxide, such as ethylene oxide or propylene oxide, in the presence of a basic catalyst, such as potassium hydroxide (KOH) to form a polyoxyalkylene polyol.

One drawback to base-catalyzed oxyalkylation reactions is that propylene oxide and certain other alkylene oxides are subject to a competing internal rearrangement that generates unsaturated alcohols. For example, where KOH is used to catalyze an oxyalkylation reaction using propylene oxide, the resulting product will contain allyl alcohol-initiated, monofunctional impurities. As the molecular weight of the polyol increases, the isomerization reaction becomes more prevalent. As a result, 800 or higher equivalent weight poly(propylene oxide) products prepared with KOH tend to have significant quantities of monofunctional impurities that can reduce the average functionality and broaden the molecular weight distribution of the polyol.

Unlike basic catalysts, however, DMC catalysts do not significantly promote the isomerization of propylene oxide. Polyether, polyester and polyetherester polyols having low unsaturation values and relatively high molecular weights may be produced with DMC catalysts. Such polyols are useful in applications such as polyurethane coatings, elastomers, sealants, foams, adhesives and the like.

However, in some processes using isocyanate reactive mixtures that incorporate DMC-catalyzed polyols, brittle flakes have been observed forming in the manufacturing equipment. Those flakes have the potential of breaking off of the equipment and becoming integrated into the final product, resulting in a product having defects. Brittle flakes have heretofore not been observed in manufacturing equipment processing isocyanate reactive mixtures containing polyols prepared in the presence of a basic catalyst, such as KOH. One potential cause of this problem may be a difference in water compatibility between the polyols used in the mixture.

Therefore, a need exists in the art for an isocyanate reactive mixture having improved water compatibility to reduce or eliminate brittle flake formation in the manufacturing equipment and the resultant defects in finished products.

SUMMARY OF THE INVENTION

Accordingly, the present invention obviates problems inherent in the art by providing an improved isocyanate reactive mixture containing at least one DMC-catalyzed polyol and, less than about 5 wt. %, based on the total weight of the isocyanate-reactive mixture, of at least one ethylene oxide (EO) containing water compatibilizer.

The present invention also provides a process for preparing the inventive isocyanate reactive mixture and polyurethane foams, coatings, elastomers, sealants and adhesives prepared with the inventive isocyanate reactive mixture.

The inventors herein have surprisingly found that the inventive isocyanate reactive mixture improves water compatibility.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The present invention provides an isocyanate reactive mixture containing at least one DMC-catalyzed polyol and less than 5 wt. %, based on the total weight of the isocyanate reactive mixture, of at least one ethylene oxide (EO) containing water compatibilizer.

The present invention further provides a process for preparing the inventive isocyanate reactive mixture involving combining at least one DMC-catalyzed polyol and less than 5 wt. %, based on the total weight of the isocyanate reactive mixture, of at least one ethylene oxide (EO) containing water compatibilizer.

The isocyanate reactive mixture of the present invention may find use in the preparation of polyurethane foams, coatings, elastomers, sealants, adhesives and the like.

Polyols

Any polyol prepared in the presence of a DMC catalyst may be employed in the isocyanate reactive mixture of the present invention. Examples of such DMC-catalyzed polyols include, but are not limited to, polyether polyols, polyester polyols as well as polyetherester polyols. DMC catalysts are well known to those skilled in the art. Such DMC catalysts are described in, for example, U.S. Pat. Nos. 3,278,457, 3,829,505, 3,941,849, 4,472,560, 5,158,922, 5,470,813, 5,627,122 and 5,482,908, as well as in U.S. patent application Ser. No. 10/251,155 (filed Sep. 20, 2002). The DMC catalysts useful in the present invention may take a variety of forms including, but not limited to, powders, pastes (U.S. Pat. No. 5,639,705) and suspensions (U.S. Pat. No. 4,472,560).

The DMC-catalyzed polyols may preferably be prepared by alkoxylating at least one starter compound with at least one oxide or a mixture of oxides in the presence of at least one DMC catalyst.

Any starter compound may be used in making the DMC-catalyzed polyols of the inventive isocyanate reactive mixture. Examples of such starter compounds include, but are not limited to, water, propylene glycol, dipropylene glycol, tripropylene glycol, neopentyl glycol, diethylene glycol, triethylene glycol, glycerine, trimethylol propane, sorbitol, methanol, ethanol, butanol, polyoxypropylene polyols, polyoxyethylene polyols, alkoxylated allylic alcohols and mixtures thereof.

The starter compound may be alkoxylated by any oxide. Examples of such oxides include, but are not limited to, ethylene oxide, propylene oxide, butylene oxide, styrene oxide or a mixture thereof. Alkoxylation of the starter compound may be accomplished using only one monomeric oxide; randomly; or blockwise with 2 or 3 different monomeric oxides.

Preferably, starter compound alkoxylation is carried out in a reactor at a temperature of from 60° C. to 250° C., more preferably, from 80° C. to 180° C., most preferably, from 90° C. to 140° C. and preferably under an overall pressure of 0.0001 to 20 bar. The alkoxylation may be carried out in bulk or an inert organic solvent, such as toluene and/or tetrahydrofuran ("THF"). The amount of solvent may preferably be up to 30 wt. %, based on the total weight of the polyol to be prepared.

Sufficient oxide may preferably be added to activate the DMC catalyst. DMC catalyst activation is indicated by a pressure decrease in the reactor, which is a sign that the oxide is being consumed.

The starter compound may preferably be stripped before it is reacted with the oxide. This stripping step may preferably be performed with both the starter compound and DMC catalyst present. Stripping may preferably be performed under vacuum as disclosed in, for example, U.S. Pat. No. 5,844,070.

Preferred stripping methods include inert gas sparging combined with vacuum stripping, wiped-film evaporation, vacuum stripping in the presence of an organic solvent and the like. Although the temperature at which stripping is performed is not critical, the stripping may preferably be performed at a temperature of from 60° C. to 200° C., more preferably, from 80° C. to 150° C. Stripping is performed at reduced pressure (less than 760 mm Hg). Preferably, stripping is performed at reactor pressures less than 300 mm, more preferably, at less than 200 mm.

Reducing the water content of the starter compound by stripping affords faster catalyst activation. Preferably, the water content of the starter compound is reduced to less than 100 ppm, more preferably, to less than 50 ppm. The water content of the starter compound may also be reduced by other methods known to skilled artisans.

The oxide concentration in the reactive mixture can be increased during alkoxylation as the molecular weight of the polyol increases.

Water Compatibilizers

The isocyanate reactive mixture of the present invention contains less than 5% of an ethylene oxide (EO) containing water compatibilizer. Such compatibilizers include, but are not limited to, block copolymers, silicon surfactants and other ethoxylated compounds such as ethoxylated fatty derivatives including fatty alcohol ethoxylates, ethoxylated fatty amines, ethoxylated tallow fatty alcohols and ethoxylated surfactant compounds.

Block Copolymers

The block copolymers of the present invention may contain ethylene oxide (EO) and at least one other alkylene oxide, such as propylene oxide (PO) or butylene oxide (BO). The block copolymers preferably have a molecular weight ranging from 500 to 10,000 and an average functionality ranging from 2 to 6. Preferred copolymers have the generalized structure of EO-PO-EO or PO-EO-PO with a molecular weight of 1000 to 4000 and an EO content of 10 to 50% by weight.

Silicone Surfactants

Any polyether modified polydimethylsiloxane surfactant, except those primarily designed as surfactants for conventional slabstock foams, may be used in the present invention. As compared to the surfactants for conventional slabstock foams, the compositions suitable according to this invention generally have a lower molecular weight siloxane backbone, lower silicon/polyether ratios (by number), and a higher percentage of ethylene oxide in the polyether modification. Examples of suitable silicone surfactants include, but are not limited to, L6900, L5440, L6980, L5100, L5440,L6701, L3350, L3001, L3002, L3003 all available from OSI and B8462, B8465, B8474, B8433, B8404, B8462, B8474, B8477, B8469, B8470, B8408, B8443, B4690, and B8460 all available from Degussa.

Examples of silicone surfactants unsuitable for use in the present invention are L-403, L-620, and L5770 all available from OSI and B8002, B4900, B8050, BF2370, B8229, B8228, B8110, and B8123 all available from Degussa.

Other Ethoxylated Compounds

Any ethoxylated fatty derivative may be used as the water compatibilizer. Such derivatives are the addition products of ethylene oxide and fatty derivatives including, but not limited to, fatty acids, fatty alcohols, fatty amides, fatty amines and fatty-substituted phenols. Preferably, the adduct contains 5 to 25 moles of ethylene oxide and more preferably 10 to 20 moles.

GENAPOL O-05O, the condensation product of a $C_{12}$–$C_{14}$ alcohol with 3 or 5 moles of ethylene oxide, available commercially from Clariant, is an example of a fatty alcohol ethoxylate useful in the present invention.

GENAMIN C100 is an example of an ethoxylated fatty amine. GENAMIN C100 is coconut fatty amine ethoxylated with 10 moles ethylene oxide and is commercially available from Clariant.

Additionally, any ethoxylated tallow fatty alcohol can be used in the present invention. GENAPOL T-200 (commercially available from Clariant) is one such example of an ethoxylated tallow fatty alcohol.

Non-ionic surfactants may also be used in the present invention. Such ethoxylated surfactant compounds preferably contain between 1 and 1000, more preferably, between 1 to 300, ethylene oxide units.

Preferred use levels of the above identified water compatibilizers are from 0.25% to 15%, more preferably from 0.5% to 5% and most preferably from 1% to 3% based on the total weight of the isocyanate reactive mixture. The water compatibilizers may be used in the present invention in an amount ranging between any combination of these values, inclusive of the recited values.

The DMC-catalyzed polyol and the at least one ethylene oxide (EO) containing water compatibilizer may preferably be combined to form the isocyanate reactive mixture of the present invention.

Isocyanate

The isocyanate reactive mixture of the present invention may preferably be reacted with any known isocyanate to form a polyurethane-forming mixture. The isocyanate component of the present invention may be one or more di- or polyisocyanates including, but not limited to, aliphatic, cycloaliphatic, and aromatic isocyanates. Preferred isocyanates include the commercially available mixtures of 2,4- and 2,6-toluenediisocyanate (TDI). Methylene diphenylene diisocyanates (MDI) are also useful in the present invention. Commercial mixtures of 2,2'-, 2,4', and 4,4'-methylene diphenylene diisocyanates are also suitable. Polymethylene polyphenylene polyisocyanates having functionalities greater than 2 (polymeric MDI) are also suitable, as are mixtures of TDI, MDI and/or polymeric MDI. Modified isocyanates such as urea-, urethane-, biuret, and carbodiimide-modified isocyanates as non-limiting examples, are also suitable.

The isocyanate preferably is present in an amount sufficient to provide an isocyanate index (NCO index) of from 70 to 130, more preferably 80 to 120, and most preferably, 90 to 115. By the term "Isocyanate Index" is meant herein the equivalent of isocyanate, divided by the total equivalent of isocyanate-reactive hydrogen containing materials, multiplied by 100. Where water is present as the blowing agent, the quantity of water present is considered in calculating the isocyanate index.

The isocyanate reactive mixture of the present invention may be used to prepare polyurethane foams, coatings, elastomers, sealants adhesives and the like. The isocyanate reactive mixture and the polyurethane-forming mixture of the present invention are both particularly useful in the preparation of low-density slabstock foams. Low density slabstock foams produced with the isocyanate reactive mixture or the polyurethane-forming mixture of the present invention preferably have densities less than 3 lbs/ft$^3$. More preferably, low density slabstock foams produced with the inventive isocyanate reactive mixture or the inventive polyurethane-forming mixture have densities of from 0.8 to 1.5 lbs/ft$^3$.

Other catalysts, additives and auxiliary agents as recognized in the art may be included with the isocyanate reactive mixture of the present invention as needed. Depending upon the particular application the inventive isocyanate reactive mixture may also contain leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The following examples merely illustrate the invention. Those skilled in the art will recognize many variations that are within the spirit of the invention and scope of the claims.

EXAMPLES

In the following examples, the below-detailed components were used:

| Polyols | |
|---|---|
| Polyol A | A glycerin-initiated polyether polyol containing an EO/PO mixed block produced using DMC catalysis and having a hydroxyl number of about 56 mg KOH/g (commercially available from Bayer Polymers LLC as ARCOL F 3040); |
| Polyol B | A glycerin-initiated polyether polyol containing an EO/PO mixed block produced using KOH catalysis and having a hydroxyl number of about 56 mg KOH/g (commercially available from Bayer Polymers LLC as ARCOL F 3022). |
| Block copolymers | |
| Copolymer A | An EO/PO block copolymer having the generalized structure EO-PO-EO with an approx. MW of 990 and an overall EO content of approx. 10% by wt. that is commercially available from BASF as PLURONIC L31; |
| Copolymer B | An EO/PO block copolymer having the generalized structure EO-PO-EO with an approx. MW of 1350 and an overall EO content of approx. 50% by wt. that is commercially available from BASF as PLURONIC L35; |
| Copolymer C | An EO/PO block copolymer having the generalized structure EO-PO-EO with an approx. MW of 1980 and an overall EO content of approx. 10% by wt. that is commercially available from BASF as PLURONIC L61; |
| Copolymer D | An EO/PO block copolymer having the generalized structure EO-PO-EO with an approx. MW of 2520 and an overall EO content of approx. 40% by wt. that is commercially available from BASF as PLURONIC L64; |
| Copolymer E | An EO/PO block copolymer having the generalized structure EO-PO-EO with an approx. MW of 3240 and an overall EO content of approx. 20% by wt. that is commercially available from BASF as PLURONIC L92; |
| Copolymer F | An EO/PO block copolymer having the generalized structure EO-PO-EO with an approx. MW of 3960 and an overall EO content of approx. 10% by wt. that is commercially available from BASF as PLURONIC L121; |
| Copolymer G | An EO/PO block copolymer having the generalized structure PO-EO-PO with an approx. MW of 1500 and an overall EO content of approx. 50% by wt. that is commercially available from BASF as PLURONIC R 10R5; |
| Copolymer H | An EO/PO block copolymer having the generalized structure PO-EO-PO with an approx. MW of 2380 and an overall EO content of approx. 40% by wt. that is commercially available from BASF as PLURONIC R 17R4; |
| Copolymer I | An EO/PO block copolymer having the generalized structure PO-EO-PO with an approx. MW of 3500 and an overall EO content of approx. 40% by wt. that is commercially available from BASF as PLURONIC R 25R4; |
| Copolymer J | An EO/PO block copolymer having the generalized structure PO-EO-PO with an approx. MW of 3720 and an overall EO content of approx. 10% by wt. that is commercially available from BASF as PLURONIC R 31R1; |
| Copolymer K | An EO/PO block copolymer having the generalized structure EO-PO-EO with an approx. MW of 2800 and an overall EO content of approx. 16% by wt.;. |
| Copolymer L | An EO/PO block copolymer having the generalized structure EO-PO-EO with an approx. MW of 4000 and an overall EO content of approx. 13% by wt.; |
| Copolymer M | An EO/PO block copolymer having the generalized structure EO-PO-EO with an approx. MW of 4000 and an overall EO content of approx. 20% by wt.; |
| Copolymer N | An EO/PO block copolymer having the generalized structure EO-PO-EO with an approx. MW of 4000 and an overall EO content of approx. 30% by wt. |
| Ethoxylated fatty alcohols | |
| Fatty Alcohol A | A $C_{12}$–$C_{18}$ exthoxylated fatty alcohol containing approx. 5 moles of EO, that is commercially available from Clariant as GENAPOL O-05O; |
| Fatty Alcohol B | A $C_{12}$–$C_{18}$ exthoxylated fatty alcohol containing approx. 11.5 moles of EO, that is commercially available from Clariant as GENAPOL 26-L-98; |
| Fatty Alcohol C | A $C_{12}$–$C_{18}$ exthoxylated fatty alcohol containing approx. 20 moles of EO, that is commercially available from Clariant as GENAPOL O-200; |
| Fatty Alcohol D | An exthoxylated fatty alcohol based on tallow containing approx. 20 moles of EO, that is commercially available from Clariant as GENAPOL T-200. |
| Ethoxylated fatty amines | |
| Fatty Amine A | A $C_{12}$–$C_{18}$ ethoxylated fatty amine containing approx. 5 moles of EO, that is commercially available from Clariant as GENAMIN O-05O; |
| Fatty Amine B | An exthoxylated fatty amine based on coconut oil containing approx. 10 moles of EO, that is commercially available from Clariant as GENAMIN C-100; |

-continued

| | |
|---|---|
| Fatty Amine C | An exthoxylated fatty amine based on coconut oil containing approx. 20 moles of EO, that is commercially available from Clariant as GENAMIN C-200. |
| Silicone surfactants | |
| Silicone Surfactant A | An EO/PO-modified polydimethylsiloxane surfactant typically used in the production of rigid polyurethane foams that is commercially available from Degussa as B8443; |
| Silicone Surfactant B | An EO/PO-modified polydimethylsiloxane surfactant typically used in the production of rigid polyurethane foams that is commercially available from Degussa as B8460; |
| Silicone Surfactant C | An EO/PO-modified polydimethylsiloxane surfactant typically used in the production of rigid polyurethane foams that is commercially available from OSI as L6900; |
| Silicone Surfactant D | An EO/PO modified polydimethylsiloxane surfactant typically used in the production of conventional slabstock foams that is commercially available from Degussa as BF2370; |
| Silicone Surfactant E | An EO/PO modified polydimethylsiloxane surfactant typically used in the production of conventional slabstock foams that is commercially available from Degussa as B8002; |

Evaluation Procedure

A dye-water/polyol partitioning methodology was used to compare water compatibility. Briefly, 3.0 g of the material to be tested (polyol or polyol+additive) was dispensed into a disposable 4 ml cuvette and allowed to stand for one (1) hour to eliminate any trapped air. Upon the head of a polyol column was placed 0.5 g of an aqueous dye solution (600 mg Rose Bengal dye in 100 ml distilled water). The diffusion of the dye was monitored over a three (3) hour period. The faster and/or more complete the diffusion, the greater the water compatibility. A subjective numerical rating was assigned using a 0 to 5 scale with 0 representing no improvement as compared to the neat DMC catalyzed polyol (Polyol A) and higher ratings corresponding to increasing improvements in water compatibility. Applying this methodology, various ethylene oxide (EO) containing additives to the DMC catalyzed polyol (Polyol A) were evaluated for improvement in water compatibility.

Examples 1–16

Copolymers

Table 1 illustrates the water compatibility improvements observed with the addition of low levels of EO/PO block copolymers. Example C-2 was prepared using Polyol B (a KOH-catalyzed polyol), and is included for comparative purposes only.

TABLE 1

| Example | Cuvette Contents | Rating |
|---|---|---|
| 1 | Polyol A | 0 |
| C-2 | Polyol B | 4 |
| 3 | Polyol A + 1% Copolymer A | 2 |
| 4 | Polyol A + 1% Copolymer B | 3 |
| 5 | Polyol A + 1% Copolymer C | 2 |
| 6 | Polyol A + 1% Copolymer D | 4 |
| 7 | Polyol A + 1% Copolymer E | 4 |
| 8 | Polyol A + 1% Copolymer F | 1 |

TABLE 1-continued

| Example | Cuvette Contents | Rating |
|---|---|---|
| 9 | Polyol A + 1% Copolymer G | 3 |
| 10 | Polyol A + 1% Copolymer H | 3 |
| 11 | Polyol A + 1% Copolymer I | 4 |
| 12 | Polyol A + 1% Copolymer J | 2 |
| 13 | Polyol A + 1% Copolymer K | 4 |
| 14 | Polyol A + 1% Copolymer L | 1 |
| 15 | Polyol A + 1% Copolymer M | 3 |
| 16 | Polyol A + 1% Copolymer N | 2 |

Examples 17–22

Ethoxylated Fatty Alcohols

Table 2 illustrates the water compatibility improvements observed with the addition of low levels of ethoxylated fatty alcohols. Example C-18 was prepared with Polyol B (a KOH catalyzed polyol), and is included for comparative purposes only.

TABLE 2

| Example | Cuvette Contents | Rating |
|---|---|---|
| 17 | Polyol A | 0 |
| C-18 | Polyol B | 4 |
| 19 | Polyol A + 1% Ethoxylated Fatty Alcohol A | 1 |
| 20 | Polyol A + 1% Ethoxylated Fatty Alcohol B | 3 |
| 21 | Polyol A + 1% Ethoxylated Fatty Alcohol C | 1 (cloudy) |
| 22 | Polyol A + 1% Ethoxylated Fatty Alcohol D | 2 (cloudy) |

Examples 23–27

Ethoxylated Fatty Amines

Table 3 illustrates the water compatibility improvements observed with the addition of low levels of ethoxylated fatty amines. Example C-24 was prepared with Polyol B (a KOH catalyzed polyol), and is included for comparative purposes only.

TABLE 3

| Example | Cuvette Contents | Rating |
|---|---|---|
| 23 | Polyol A | 0 |
| C-24* | Polyol B | 4 |
| 25 | Polyol A + 1% Ethoxylated Fatty Amine A | 1 |
| 26 | Polyol A + 1% Ethoxylated Fatty Amine B | 2 |
| 27 | Polyol A + 1% Ethoxylated Fatty Amine C | 4 |

Examples 28–32

Silicone Surfactants

Table 4 illustrates the water compatibility improvements obtained through the addition of EO/PO modified polydimethylsiloxane surfactants that are typically used in rigid polyurethane foams. Example C-29 was prepared with Polyol B (a KOH catalyzed polyol), and is included for comparative purposes only.

TABLE 4

| Example | Cuvette Contents | Rating |
| --- | --- | --- |
| 28 | Polyol A | 0 |
| C-29 | Polyol B | 4 |
| 30 | Polyol A + 1% Silicone Surfactant A | 1 |
| 31 | Polyol A + 1% Silicone Surfactant B | 2 |
| 32 | Polyol A + 1% Silicone Surfactant C | 3 |

Examples 33–38

Increased Silicone Surfactant Concentration

Table 5 illustrates the effect of increasing silicone surfactant concentration of the best silicone surfactant from Table 4. Example C-34 was prepared with Polyol B (a KOH catalyzed polyol), and is included for comparative purposes only.

TABLE 5

| Example | Cuvette Contents | Rating |
| --- | --- | --- |
| 33 | Polyol A | 0 |
| C-34 | Polyol B | 4 |
| 35 | Polyol A + 0.5% Silicone Surfactant C | 1 |
| 36 | Polyol A + 1.0% Silicone Surfactant C | 3 |
| 37 | Polyol A + 1.5% Silicone Surfactant C | 3 |
| 38 | Polyol A + 2.5% Silicone Surfactant C | 4 |

Comparative Examples 39–42

Table 6 illustrates that no improvement in water compatibility was obtained with silicone surfactants D and E, which are typically used in the production of slabstock foams. Example C40 was prepared with Polyol B (a KOH catalyzed polyol), and is included for comparative purposes only.

TABLE 6

| Example | Cuvette Contents | Rating |
| --- | --- | --- |
| C-39 | Polyol A | 0 |
| C-40 | Polyol B | 4 |
| C-41 | Polyol A + 1% Silicone Surfactant D | 0 |
| C-42 | Polyol A + 1% Silicone Surfactant E | 0 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. An isocyanate reactive mixture comprising:
   at least one double metal cyanide (DMC) catalyzed polyol; and
   about 0.25 to about 15 wt. %, based on the total weight of the isocyanate reactive mixture, of at least one ethoxylated water compatibilizer.

2. The isocyanate reactive mixture according to claim 1, wherein the ethoxylated water compatibilizer is selected from the group consisting of block copolymers, silicon surfactants, ethoxylated fatty alcohols, ethoxylated fatty amines, ethoxylated tallow fatty alcohols and ethoxylated surfactant compounds.

3. The isocyanate reactive mixture according to claim 1, wherein the at least one double metal cyanide (DMC) catalyzed polyol is selected from the group consisting of polyether polyols, polyester polyols and polyetherester polyols.

4. The isocyanate reactive mixture according to claim 1, wherein the at least one ethoxylated water compatibilizer comprises about 0.5 to about 5 wt. % of the isocyanate reactive mixture.

5. The isocyanate reactive mixture according to claim 1, wherein the at least one ethoxylated water compatibilizer comprises about 1 to about 3 wt. % of the isocyanate reactive mixture.

* * * * *